SUBSCRIBER'S KEY TELEPHONE STATION AND SIGNALING CIRCUIT

Filed May 12, 1954 5 Sheets-Sheet 1

INVENTOR
H. T. CARTER
BY John E. Cassidy
ATTORNEY

SUBSCRIBER'S KEY TELEPHONE STATION AND SIGNALING CIRCUIT

Filed May 12, 1954 5 Sheets-Sheet 2

INVENTOR
H. T. CARTER
BY John E. Cassidy
ATTORNEY

INVENTOR
H. T. CARTER
BY John E. Cassidy
ATTORNEY

INVENTOR
H. T. CARTER
BY John E. Cassidy
ATTORNEY

Sept. 2, 1958 H. T. CARTER 2,850,579

SUBSCRIBER'S KEY TELEPHONE STATION AND SIGNALING CIRCUIT

Filed May 12, 1954 5 Sheets-Sheet 5

INVENTOR
H. T. CARTER
BY John E. Cassidy
ATTORNEY

United States Patent Office 2,850,579
Patented Sept. 2, 1958

2,850,579

SUBSCRIBER'S KEY TELEPHONE STATION AND SIGNALING CIRCUIT

Herman T. Carter, Madison, N. J., assignor to Bell Telephone Laboratories, Incorporated, New York, N. Y., a corporation of New York Application May 12, 1954, Serial No. 429,176

9 Claims. (Cl. 179—99)

This invention relates to key telephone switching systems and more particularly to improvements in such systems whereby subscriber or operator telephone set circuits, located on a multistation subscriber's premises, may be connected to any of a plurality of outside telephone lines extending from the premises to remote points, such as central offices or private branch exchanges or other key telephone systems or stations located on other premises. It has been found that there is an increasing need for more flexible and more economical key telephone switching arrangements in many local areas, such as in business offices, for instance, to permit access of various telephones in the business office to the available outside line facilities in an ordered preference or sequence of privacy.

As an example of the foregoing, it may be desirable to afford an official of a company immediate access to an outside line at any time, whether the line is momentarily in use by another or not, and to ensure that the line may not be taken by any other telephone connectable to the line while the official continues to use the line. The line may be made available to others at times when it is not required by the official in accordance with their lower orders of priority. It may be desirable to afford an executive of the company access to an outside line in a manner such that the line is available at any time except when it is in use by the official. That is to say that the executive may preempt the line from others having a lower order of priority. And the executive's priority circuit may be further arranged so that, once he has been connected to the line, the line may not be taken away from him by anyone while he continues to use it. Further it may be desirable to afford a preferred employee of the company access to a line only when it is not employed by anyone but in such manner that the line may not be preempted by another when it is being used by the preferred employee. And finally, it may be desirable to afford a nonpreferred employee access to an outgoing line only when it is not in use and to make it available to those having higher priority even though it is momentarily in use by a nonpreferred employee. In short, to serve certain large subscribers efficiently, it is desirable to afford them access to outside line facilities connected to their establishments in accordance with preference arrangements having an increasing number of orders or gradations of access. The four different orders of service described in the foregoing are termed hereinafter the four orders or degrees of priority or of access and it may be observed that they comprehend also orders of privacy or of freedom from interference from others connectable to the line.

Obviously it is desirable to keep the number of switching elements required to afford an ordered priority of access to outside lines to a minimum. This is desirable not only from the standpoint of first cost, but more importantly in consideration of the cost of maintaining such facilities, since they are ordinarily located at a distance from telephone exchanges and maintenance therefore requires a visit to the subscriber's premises by a telephone service employee.

An object of the present invention is the improvement of key telephone switching systems installed on subscriber premises.

A further object of the present invention is the provision of a telephone line access preference circuit having a smaller number of switching elements than heretofore required.

A more specific object of the invention is the improvement and simplification of subscriber telephone line access preference circuits arranged to afford the following classes of priority:

(1) A station can cut off other stations from the line and cannot be cut off.

(2) A station can cut off other stations from the line and can be cut off except during a call.

(3) A station or stations cannot cut off other stations and can be cut off except during a call.

(4) A station or stations cannot cut off other stations and can be cut off at any time.

A feature of the invention is an improved automatic cut-off circuit and an improved cut-through and control circuit for the automatic cut-off circuit, which are arranged to cut off telephone station circuits from a line incoming from a remote point in accordance with established priorities.

These and other features of the invention may be understood from the following description when read with reference to the associated drawings which taken together disclose a preferred embodiment in which the present invention is incorporated. It is to be understood, however, that the invention is not limited to the specific embodiment disclosed herein, but may be incorporated in other embodiments which will be readily suggested to those skilled in the art from a consideration of the following.

Figure 1:
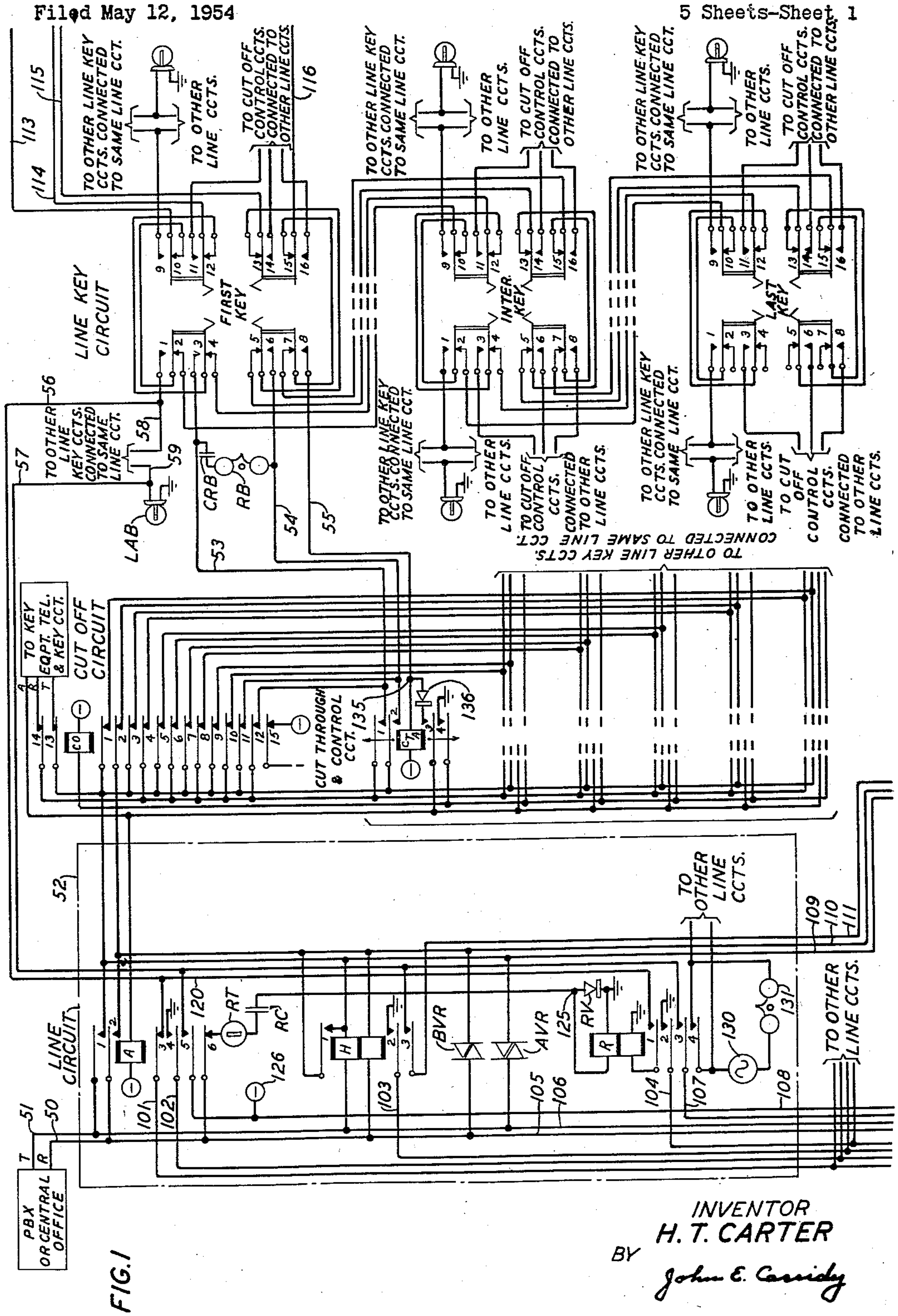
Fig. 1 shows a line circuit, an automatic cut-off circuit, a plurality of cut-through and control circuits and a line key circuit.
Figures 2, 4:
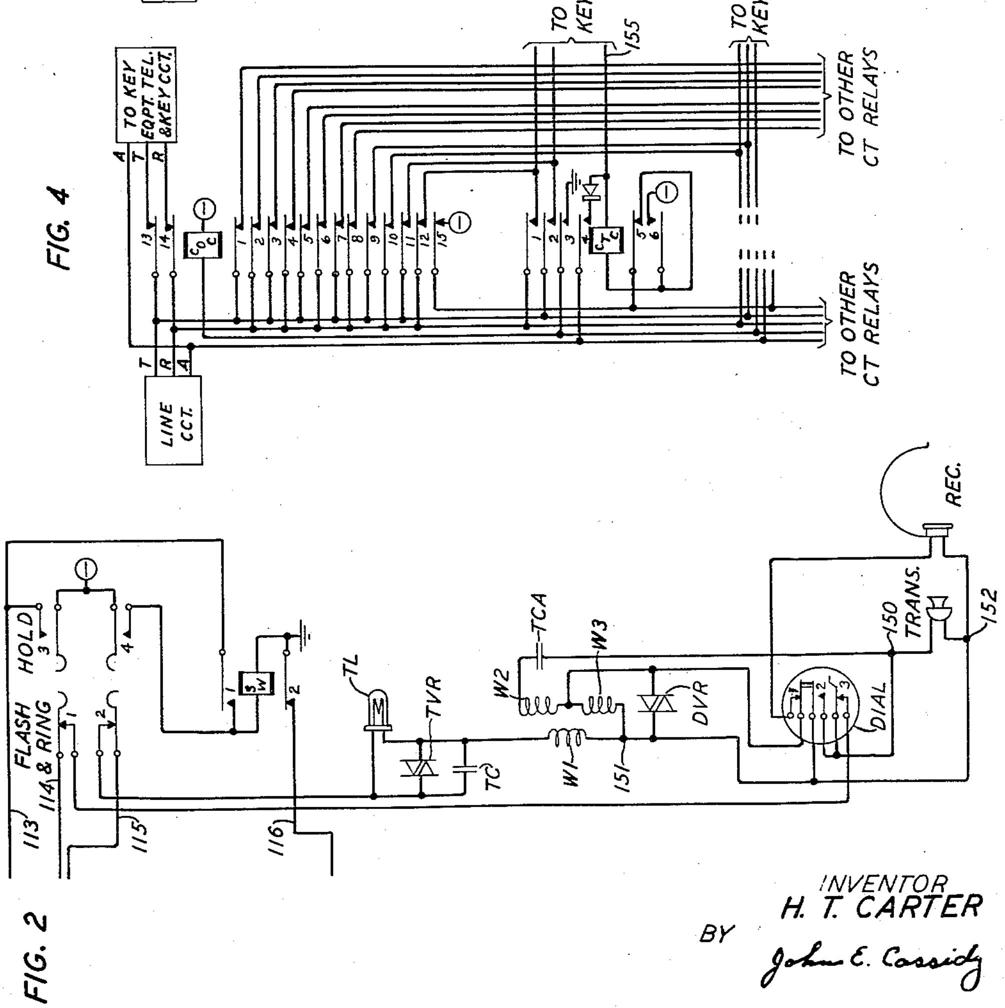
Fig. 2 shows a flash and ring key circuit, a hold key circuit and a subscriber telephone circuit.
Fig. 4 shows a cut-through and control circuit for automatic cutoff and an automatic cut-off circuit arranged to afford a particular priority different from the arrangement shown in Fig. 1.
Figure 7:
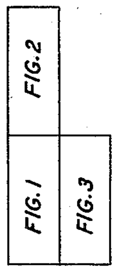
Figure 3:
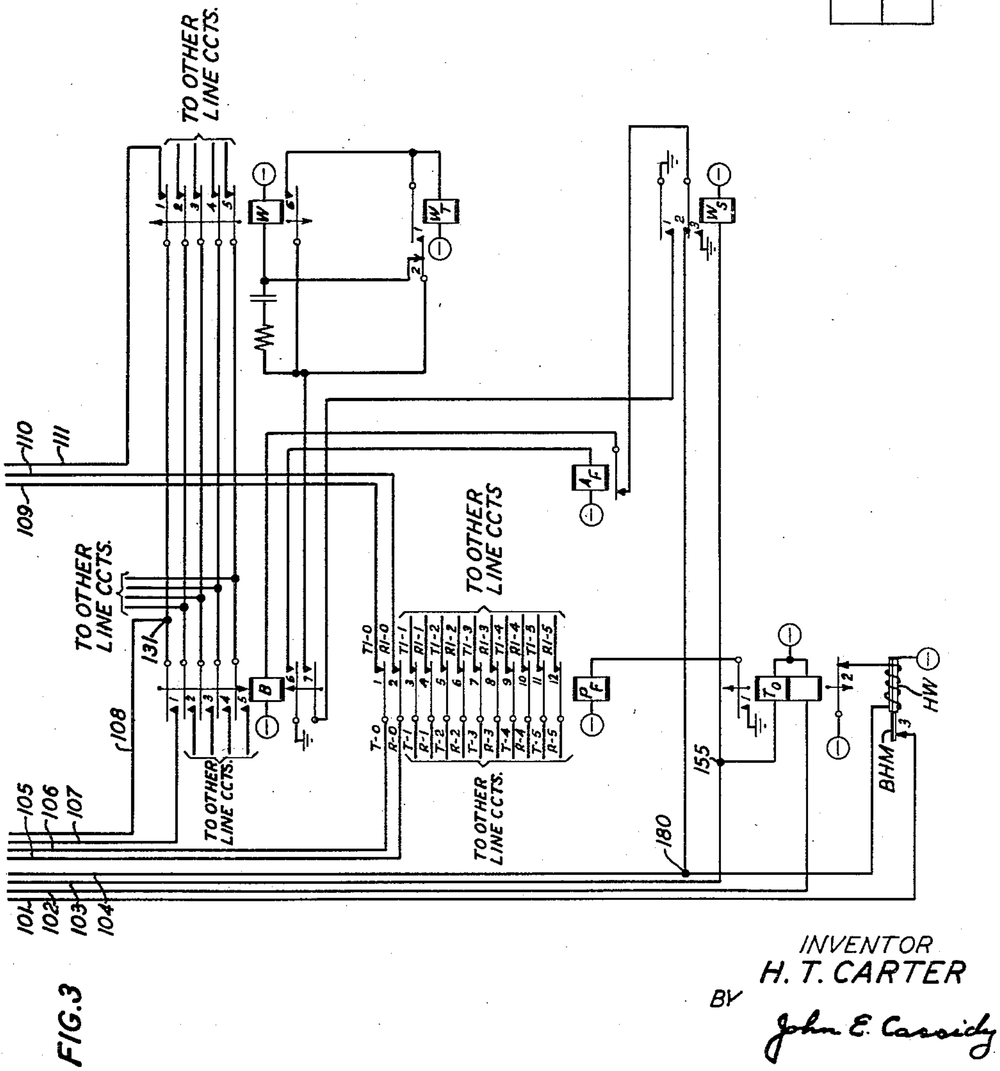
Fig. 3 shows a lamp flashing and incoming signal timeout circuit and a lamp winking circuit.
Figure 6A:
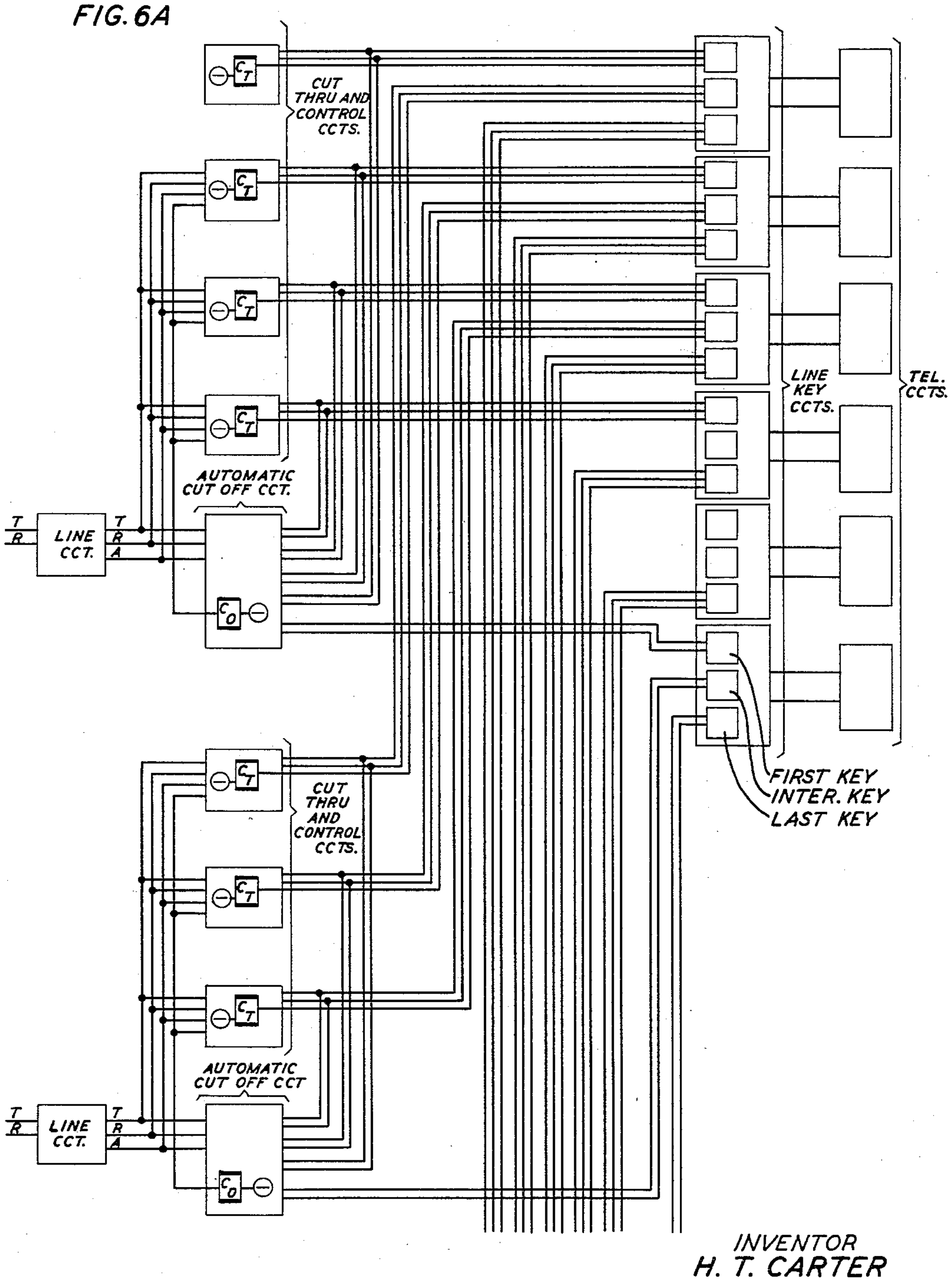
Figure 6B:
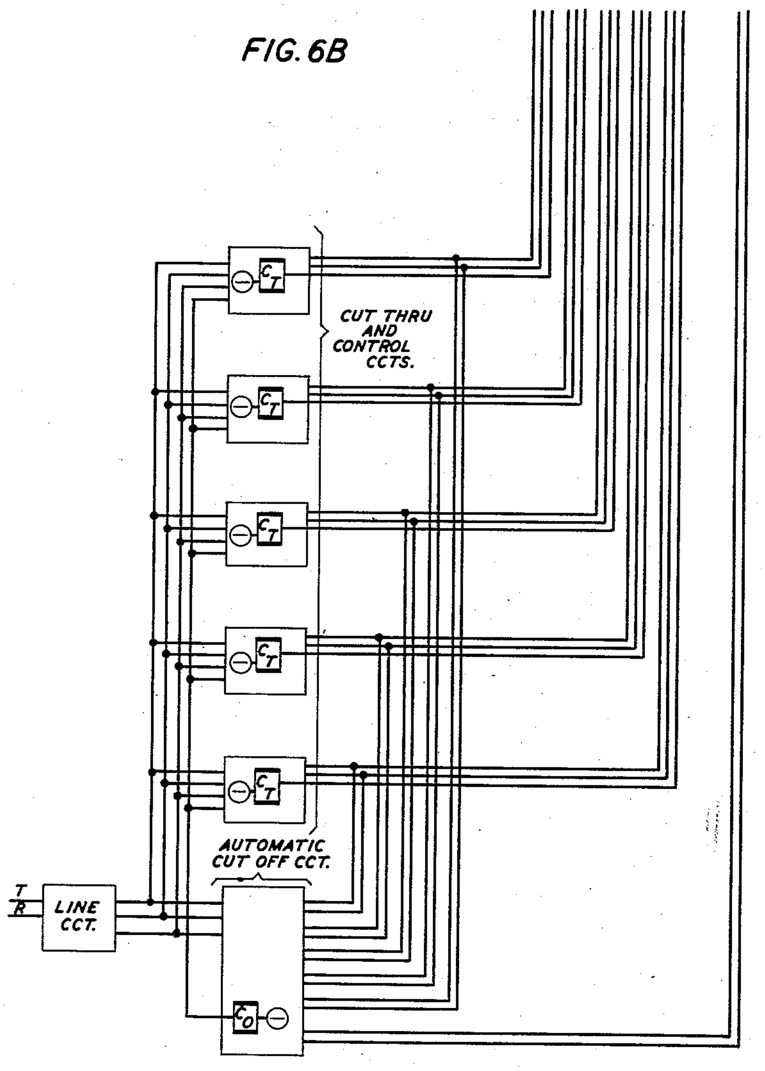

Figs. 6A and 6B taken together, with Fig. 6A above Fig. 6B, show a diagram used in explaining the invention; and Fig. 7 is a block diagram showing the manner in which Figs. 1, 2 and 3 should be disposed to form an operative system.

Before proceeding with a detailed description of the operation of the circuits of the system, the general relationship and the functions of the major units comprising it will be described in a general way as an aid in understanding the detailed operation.

Figs. 6A and 6B taken together constitute a diagram of the system, in which the major circuit units, those shown in Fig. 1 and Fig. 2, are indicated by captioned rectangles and shown in their general relationship one to another so as to facilitate an understanding of the traffic through these major components. The circuit of Fig. 3, which controls the flashing of signal lamps and other minor features, is not included in Figs. 6A and 6B for purpose of simplification of the general description.

The present invention as mentioned is essentially an arrangement for permitting individuals equipped with telephone sets to have access on a priority basis to outside telephone line facilities such as lines to central offices or private branch exchanges, automatic tie line circuits, ringdown tie line circuits and station line circuits. These various line circuits extend to distant points such as to central offices, private branch exchanges and other installations corresponding to the one to be described herein, and are employed to interconnect a local area such as a business office, for instance, where the present facilities are assumed to be located, to the distant points. Such facilities are known in the art as key telephone systems. The various line facilities, which are typified by a central office or private branch exchange line circuit to be described hereinafter in detail, are represented by captioned rectangles in Figs. 6A and 6B and shown at the left in these figures. There may be a widely differing number of such lines incoming to a particular local area depending upon these requirements. Certain installations may have five lines, for instance, or fewer. Other local areas may have as many as 40 line circuits of a number of different kinds.

At the extreme left in Figs. 6A and 6B there are shown three pairs of tip and ring conductors which connect, external to the drawings, to a distant office. Within the figures, these incoming pairs of conductors each extend through an individual rectangle, designated line circuit, which typifies any of the switching facilities which may be employed with the various outside lines to control the signaling and switching. Only three of the maximum possible 40 line circuits, which may connect to one station, for instance, are shown. From the line circuits, each incoming circuit is extended through an individual automatic cut-off circuit, indicated by the large rectangle of the group of rectangles in vertical alignment to the right of each line circuit. The automatic cut-off circuit, as will be explained hereinafter, is a relay circuit having a number of parallel pairs of branches through a plurality of pairs of contacts, not shown, which contacts are normally closed, and through which the pairs of tip and ring conductors of the associated individual line are normally extended.

Each of the lines incoming from the distant office is thus provided with a plurality of branches which are available for distribution to the individual telephone circuits shown at the extreme right in Fig. 6A. But to afford priority of different orders, each of the telephone circuits, in addition to being provided with a plurality of keys, to afford access to the individual outside lines, is provided also with an individual priority control called herein a cut-through and control circuit, which is responsive to the actuation of its individual key, associated with a particular telephone, to control the automatic cut-through circuit in accordance with the priority assigned to the particular telephone circuit. The cut-through and control circuits are represented by the plurality of smaller rectangles shown above each automatic cut-off circuit. There will ordinarily be a plurality of cut-through and control circuits, one for each telephone, associated with each line, to afford the established order of priority.

In the present arrangement a number of line key circuits are shown at the right in Fig. 6A connecting to a number of telephone circuits. Correspondingly at the right in Fig. 1 an individual line key circuit is shown connecting to a telephone circuit in Fig. 2. It is to be understood, however, that a simpler arrangement, known in the art as a key and telephone circuit, not shown, may be employed instead of the facilities illustrated.

When a particular key in an array of keys, called herein a line key circuit, is operated its associated cut-through and control circuit will be actuated to control the automatic cut-off circuit according to the priority assigned to the telephone circuit. The key associated with a particular line may be any one of the keys in any line key circuit. Six such line key circuits are shown in the upper right-hand portion of Fig. 6A. Each one connects to an individual telephone circuit. Only three keys are shown in each line key circuit, a First Key, an Intermediate Key and a Last Key. It is to be understood that the intermediate key may represent any number of keys from 1 to 38, for instance. The keys are arranged so that each is connectable to a particular line through its individual cut-through and control circuit. When any key of a particular line key circuit is operated the associated telephone circuit, individual to the line key circuit, will be extended through the contacts of the various unoperated keys and the contacts of the operated key to the particular line connectable to the operated key if the line is available, that is to say, if the priority condition warrants the connection at the moment.

The cut-through and control circuits are arranged in different manners, to be explained hereinafter, to afford the different priorities for the connection of the different associated telephone circuits to the particular line.

The present circuits are arranged also to hold a line on which a call is incoming until it is picked up at another station and to provide an indication that the line is being held and thereafter that it has been picked up. The various lines are equipped also with a number of signaling and other supervisory arrangements which will be described hereinafter.

DETAILED DESCRIPTION OF OPERATION OF CIRCUIT

Refer now to Figs. 1, 2 and 3 disposed as in Fig. 7.

*Incoming call*

This arrangement shows at the upper left of Fig. 1 a rectangle which represents well-known equipment at a private branch exchange or central office which cooperates with the present circuit. It is connected to the present circuit by means of two conductors 50 and 51, which connect to a line circuit 52, shown within the broken line rectangle. This line circuit corresponds to any of the line circuits identified in the rectangles shown at the left in Figs. 6A and 6B. The automatic cut-off circuit individual to line circuit 52 is the relay CO and its associated wiring shown to the right of line circuit 52 in the upper portion of Fig. 1. This cut-off circuit controls the cutting off of the line circuit 52 from the various line key circuits to which the particular line circuit 52 is connectable. It is to be understood that the three sets of keys shown in the vertical row, at the right in Fig. 1, are all part of a single line key circuit which connects to a single telephone circuit shown at the left in Fig. 2. The three keys in the line key circuit per Fig. 1 are intended to simulate all of the keys in this particular line key circuit. It is to be understood, as mentioned in the foregoing, that there may be any number of keys up to 40 or more in a particular line key circuit associated with a particular single telephone circuit per Fig. 2. In the line key circuit at the upper right in Fig. 1 the top key is labeled First Key. The middle key is labeled Inter Key and represents any one of all the keys in a particular line circuit intermediate the First Key and the Last Key, shown at the bottom right in Fig. 1, and identified as Last Key.

It is to be understood further that the line circuit 52 will be connected to a number of other line key circuits in addition to the one shown in detail in Fig. 1. This is indicated by the conductors shown in the lower middle portion of Fig. 1 extending to the bracket labeled To Other Line Key Circuits Connected to Same Line Circuit. Line circuit 52 will be connected to an individual key in each of the line key circuits to which it is connectable. In the case of the particular line key circuit shown in detail in Fig. 1, line circuit 52 is connected through conductors 53, 54, 55 and 56 to the First Key and through conductor 57 to a signaling lamp LAB associated with the First Key. It could be connected instead to any other of the keys comprising the line key circuit in Fig. 1. The line key circuit shown in detail at the right in Fig. 1 will be connected to other line circuits, similar to line circuit 52, each one of the keys in the line key circuit giving access to a particular line circuit. In the circuit of Fig. 1, only one cut-through and control circuit for the automatic cut-off relay CO is shown in detail. It comprises the relay CTA and the wiring and apparatus associated with relay CTA. The cut-through relay CTA is individual to the line key circuit shown at the right in Fig. 1 and more particularly is under control of the First Key in that line key circuit.

Since line circuit 52 is connectable to other line key circuits, not shown in detail, it must be provided with a cut-through and control circuit, such as that comprising relay CTA, individual to each such line key circuit, to enable each such line key circuit to control the associated cut-off circuit, common to all of the cut-through and control circuits associable with a particular line circuit, for automatic cut-off.

Associated with each relay, such as relay CTA, are three conductors, corresponding to conductors 53, 54 and 55, which are each connectable to individual keys in other line key circuits to afford access to the individual telephone circuit connected to each such line key circuit and to control the automatic cut-off circuit per relay CO associated with line circuit 52 according to the priorities to be described hereinafter. Conductors 56 and 57 are multipled to the same keys in the other line key circuits and to lamps corresponding to lamp LAB, respectively, associated with the keys to which the conductors corresponding to conductors 53, 54 and 55 are connected.

*Signaling*

It will now be assumed that a call is incoming from a distant central office or private branch exchange over conductors 50 and 51 and through line circuit 52. Alternating ringing current is applied at the distant point to conductor 50 and a circuit may be traced through contact 6 of relay A in line circuit 52, thermistor RT and condenser RC to two parallel branches, one branch of which extends through the top winding of relay R and the other branch of which extends through varistor RV to ground. The resistance of thermistor RT may normally be approximately 50,000 ohms, for instance. This prevents relay R from operating when ringing is first applied. The purpose of this is to prevent the false operation of relay R in response to short transient conditions, such as false connection of the tip of a cord circuit plug to conductor R during the disconnect operation, when a cord is being removed from a jack at the distant office. Such connection will ordinarily be of a few one thousandths of a second duration only, when on rare occasion it occurs. The thermistor RT requires a maximum of approximately one-half second to absorb enough power from the ringing current to permit its resistance to drop to 3,000 ohms, for instance, and allow sufficient current to flow through the top winding of relay R to operate the relay. The nonlinear resistor or varistor RV, which is a well-known current polarity discriminating device dependent upon the manner in which its terminals are connected in the circuit, will shunt each positive half cycle of the current applied to terminal 125 to ground. As arranged in the drawing, it is poled so that it presents a low resistance for current of a positive polarity and high resistance for current of negative polarity. The negative half cycles only of the ringing current will pass through the top winding of relay R to ground, so that relay R will operate on the rectified current. When relay R operates it is locked over a path from ground through the bottom winding and contact 1 of relay R, conductor 120, contact 3 of relay A, conductor 101, which extends into Fig. 3 and the contact of bimetallic, heat responsive element BHM to battery. The operation of relay R also establishes a circuit from ground through contact 2 of relay R, conductor 104, which extends into Fig. 3, heater winding HW of element BHM and contact 2 of relay TO to battery, supplying power which is transformed into heat in heater winding HW. To anticipate, the purpose of bimetallic element BHM and winding HW is to measure an interval during which a call may be answered before element BHM is actuated responsive to the heat, to open the contact of element BHM, thereby opening the locking circuit of relay R and permitting relay R to release and line circuit 52 to return to normal, if the call is not answered during the permitted heating interval. If a station is busy the heater winding is open to prevent timing out the incoming calling signal. It is to be understood that other timing devices may be employed to perform this function. From junction 180 in conductor 104, in the path last traced, a parallel circuit extends through contact 2 of the signal lamp winking relay WS, contact of slow-to-release relay AF, in the lamp flashing circuit, and the winding of slow-to-operate relay B, in the lamp flashing circuit, to battery, operating relay B. The operation of relay R also establishes a circuit from battery 126 through conductor 108, which extends into Fig. 3, to junction 131 of parallel branches. One branch extends through contact 1 of relay B, conductor 107, which extends into Fig. 2, contact 3 of relay R, conductor 57 and the filament of line signal lamp LAB to ground, lighting the lamp as a signal that a call is incoming. The lamp lead is multipled to other lamps at the position of other keys in other line key circuits associated with the same line circuit 52 so that the incoming call may be answered also at any of these points in a manner to be described hereinafter.

The lamps, such as lamp LAB, will be flashed intermittently through the operation of the flashing circuit. The manner in which this is performed is as follows. The operation of relay B establishes a circuit from ground through contact 6 of relay B and the winding of relay AF to battery operating relay AF. The operation of relay AF opens the circuit, traced through the winding of relay B, releasing relay B, opening contact 1 thereof and extinguishing lamp LAB. The release of relay B also opens its contact 6, in turn releasing slow-to-release relay AF. When the contact of relay AF recloses, slow-to-operate relay B is again energized, closing its contact 1 to again light the lamps such as lamp LAB. The reoperation of relay B recloses its contact 6 to again energize relay AF. By making relay B slow to operate and relay AF slow to release, the intervals of illumination and extinction of lamp LAB may be made appreciable and afford an arrangement wherein a lamp which goes through a flashing cycle in approximately one second, for instance.

The operation of relay R also closes the circuit of a common audible signal circuit, operating a continuous audible signal. This circuit may be traced from a source of alternating current 130 through contact 4 of relay R and the audible signal 131 back to source 130.

*Answersing an incoming call*

An incoming call is answered by operating the key in any line key circuit, indicated by the associated flashing lamp, which key is connected in a manner to be described, to the line which is being rung. In this case it will be assumed that the actuating mechanism associated with the left-hand contacts of the First Key in the line key circuit, shown in detail in Fig. 1, will be operated to open the presently closed contacts thereon and to close the alternative contacts. A circuit may then be traced from ground through contact 2 of relay SW in Fig. 2, conductor 116 which extends into Fig. 1, contact 15 of the First Key, contact 8 of the First Key to junction 135 where parallel branches are formed. One branch extends through the winding of relay CTA, in the cut through and control circuit, to battery operating relay CTA. The operation of relay CTA closes the other parallel branch of the circuit which extends through varistor 136, contact 3 of relay CTA and the winding of relay A in line circuit 52 to battery operating relay A. The further effect of the operation of relay CTA will be described hereinafter. Presently the effect of the operation of relay A only will be considered. The operation of relay A short-circuits the top and bottom windings of relay H. The top winding of relay H is connected in series with conductor 51 across the normally open contact 1 of relay A. The bottom winding of relay H is connected in series with conductor 50 across the normally open contact 2 of relay A. Now that contacts 1 and 2 are closed, the top and bottom windings of relay H are short-circuited. Relay H, prior to the complete operation of relay A, may operate momentarily if another line, conected to the line key circuit shown in detail at the right of Fig. 1, is busy or is being held in a manner to be described hereinafter. However, relay H releases when its top and bottom windings are effectively short-circuited. The operation of relay A, by opening its contact 3, opens the locking circuit of relay R and relay R releases. The operation of relay A, by opening its contact 6, opens the circuit which was traced from conductor 50 through thermistor RT, condenser RC and varistor RV, the latter in parallel with the top winding of relay R, to ground. The objective of this is to detach this ringup circuit from one side of the line which would otherwise cause an unbalanced impedance to ground if it remained connected during the talking interval. The operation of relay A also establishes a circuit from battery 126 through contact 5 of relay A and the filament of all lamps such as lamp LAB to ground. As a result of this, all lamps, such as lamps LAB, will now be lighted steadily to indicate that the call has been answered. It will be recalled that while the incoming call was awaiting answer, lamp LAB was flashed relatively slowly or about one time per second. The operation of relay A also establishes a circuit from ground through contact 4 of relay A, conductor 102, which extends into Fig. 3, and through the bottom winding of relay TO to battery operating relay TO. The operation of relay TO, by opening its contact 2, opens the circuit through the heater winding associated with element BHM. The reason for this is that, since the system is attended, as indicated by the operation of relay TO, the incoming call will doubtless be answered when the call in progress is completed and the heater winding should therefor be disconnected.

The operation of relay TO establishes a circuit from ground through contact 1 of relay TO and the winding of power failure relay PF to battery operating power failure relay PF. Power failure relay PF is operated by time-out relay TO whenever a station of the present key telephone system makes a line busy or when a line is held. When power failure relay PF is in the normal unoperated condition, back contacts of relay PF short-circuit the top and bottom windings of the hold relay H in each of the line facilities. The circuit may be traced for the top winding of relay H in line circuit 52 from the left-hand terminal of the top winding through conductor 106, which extends into Fig. 3, through normally closed contact 1 of relay PF and conductor 109, which extends into Fig. 1, to the right-hand terminal of the top winding of relay H. The circuit which short-circuits the bottom winding of relay H may be traced from the left-hand terminal of the bottom winding of relay H through conductor 105, which extends into Fig. 3, normally closed contact 2 of relay PF and conductor 110, which extends into Fig. 1, to the right-hand terminal of the bottom winding of relay H. In the event that there is a power failure in the local area, where the present equipment is assumed to be located, relay PF will remain released and the short circuits about the top and bottom windings of relay H will prevent the operation of relay H, which in turn will prevent the locking up of relay H on current supplied over the line from the distant terminal. Since relay H locks up on current over the line from the distant terminal, when it is operated, and applies a bridge across the tip and ring conductors 50 and 51, in a manner to be explained, local power failure prevents its operation and locking up on current supplied over the line. If relay H locked up it would light signal lamp LAB permanently and prevent the use of the line circuit in calling out over the line from the local station, as the bridge would effectively prevent dialing, which consists in pulsing over the line by opening and closing the line by means of the dial in the telephone circuit. Since relay H cannot lock up in the case of power failure the bridge across the line cannot be applied and it is, therefore, possible to dial out over the line. This will be made more apparent hereinafter.

Attention is particularly called to the fact that whereas line circuit 52 is individual to a line, the apparatus and circuitry shown in Fig. 3 are common to a plurality of lines. This is indicated by the spurs shown in the lower left-hand corner of Fig. 1 which extend to a bracket labeled To Other Line Circuits. Thus relay TO and its associated apparatus are common to a number of lines. The power failure relay PF, controlled by relay TO, is common to a number of lines as indicated by the brackets associated with the contacts on relay PF. The flashing circuit comprising relays AF and B is common to a number of lines as is the winking circuit comprising relays W, WT and WS. Relay TO, for instance, will be operated in the manner described in the foregoing by any of the line circuits and unless there has been a power failure in the local area, relay PF will be operated whenever relay TO operates. Thus the short circuit around the top and bottom windings of the holding relay, such as relay H in each of the line circuits, will be opened whenever power failure relay PF operates, the single power failure relay PF opening all of the windings of all H relays. Varistor units AVR and VBR, shown in Fig. 1, are each nonpolarized units which shunt the top and bottom windings, respectively, of relay H to prevent its operation when ringing current is being applied on an incoming call.

The talking path for the circuit, when in condition for communication, with the A relay operated and the left-hand units of the First Key of the line key circuit operated, may now be traced through conductor 51, contact 1 of relay A, contact 11 of relay CO or contact 2 of relay CTA, depending upon which of these relays is operated at the time, in a manner to be described, contact 3 of the First Key, contact 12 of the First Key, conductor 114, which extends into Fig. 2, contact 1 of the flash and ring key and contact 3 of the dial to junction 150 of parallel branches. One of the parallel branches extends through the transmitter in the telephone circuit to junction 151 of parallel branches. One of these latter parallel branches extends through winding W1 of the three-winding telephone inductance coil, through the filament of telephone lamp TL, varistor TVR and condenser TC in parallel, contact 2 of the flash and ring key, conductor 115, which extends into Fig. 1, contact 13 of the First Key, contact 6 of the First Key, conductor 54, contact 1 of relay TCA or contact 12 of relay CO, depending upon which is operated, contact 2 of relay A and conductor 50 to the distant private branch exchange or central office. From junction 150 a circuit may be traced through condenser TCA, winding W2 of the telephone inductance coil, contact 1 of the dial, through the telephone receiver to junction 152 on the opposite side of the transmitter from junction 150. Winding W3 of the telephone inductance coil is connected between the bottom terminals of winding W1 and winding W2. The windings of coils W1, W2 and W3 are arranged in a well-known manner to comprise an anti-sidetone circuit, so that speech signals impressed upon the transmitter are balanced out of the receiver, while signals incoming from the line are heard in the receiver.

*Outgoing call*

The procedure for originating an outgoing call is the same as for answering an incoming call, that is to say, to originate an outgoing call, the key unit, connected to the line over which the call is to be transmitted, is actuated, which bridges the telephone set across the particular line. The keys in each line key circuit are connected in series in such a manner that the operation of any key unit establishes a chain circuit from the particular operated key through the contacts of each of the remaining keys intervening between the operated key and the telephone circuit and disconnects the other key units from the telephone circuit. For instance, if the right-hand unit of the Last Key in the line key circuit, that is the key unit shown at the right in the lower right-hand corner of Fig. 1, is acuated, it will connect the tip and ring conductors incoming from some other line as well as a single control conductor for the A relay associated with that line and for a cut-through relay corresponding to relay CTA through the operated contacts of the key in the lower right-hand corner of Fig. 1 and in series through normally closed contacts of all of the other keys in the line key circuit to the telephone circuit in Fig. 2. When an outgoing call is made it is to be understood that the relay corresponding to relay R in the line circuit, such as 52, which is involved, will not be operated as in the case of responding to an incoming call, since there will have been no ringing incoming to the line circuit. In other respects the operation is the same as described in the foregoing.

*Holding*

An incoming or outgoing call can be held by operation of the Hold Key in the telephone set circuit per Fig. 2. The operation of the Hold Key establishes a circuit from battery through contact 4 of the Hold Key and the winding of relay SW to ground operating relay SW. The operation of relay SW, by opening its contact 2, disconnects ground from the path extending through conductor 116 which has heretofore been shown to control the operation of the relay CTA in the cut-through circuit and the relay A in the line circuit. Disregarding relay CTA for the present, this releases relay A. The release of relay A in turn, by opening its contacts 1 and 2, removes the short circuits about the top and bottom winding of holding relay H and permits relay H to operate on current supplied from the distant private branch exchange or central office through the telephone set. The release of relay A, by opening its contact 4, disconnects ground from the path traced through the bottom winding of relay TO in Fig. 3. It is to be understood that this winding of relay TO is under control also of corresponding contacts on relay A in other line circuits. Assuming that no other A relay is momentarily operated, relay TO will tend to release. However, relay TO is a slow-to-release relay and remains operated during the time its bottom winding is opened by the release of relay A while relay H operates. The operation of relay H establishes a circuit from ground through contact 2 of relay H, conductor 103, which extends into Fig. 3, and to junction 155 of parallel branches. One of these parallel branches extends through the top winding of relay TO to battery maintaining relay TO operated. The other of the parallel branches extends through the winding of relay WS in the winking circuit to battery operating relay WS. The Hold Key in the telephone circuit per Fig. 2 must be held operated for sufficient time to permit relay A to release and relay H to operate before the line key is restored to its normal unoperated condition. Relay H locks operated over a path from battery, supplied at the distant private branch exchange or central office, through conductor 51, top winding or relay H, contact 1 of relay H, bottom winding of relay H and conductor 50 to the other side of the battery at the distant terminal. The operation of relay H establishes a new signaling condition for lamp LAB to differentiate from the relatively slow flashing condition which indicates an incoming call and a steadily lighted condition, which indicates a call which is being answered. It establishes a rapidly flashing of winking condition, as it is otherwise known, to indicate the presently held condition of the line. The winking circuit may be traced from ground through the filament of lamps such as lamp LAB, contact 3 of relay H, conductor 111, which extends into Fig. 3, contact 1 of winking relay W and conductor 108, which extends into Fig. 1, to battery 126. The contacts of relay W may be opened for approximately 30 milliseconds, once per second, to cause lamp LAB to flash momentarily or wink, as it is presently termed, in the following manner. The operation of relay A was shown to operate relay WS. The operation of relay WS in turn starts the flashing circuit by connecting ground through contact 3 of relay WS, contact of slow-to-release relay AF and the winding of slow-to-operate relay B operating relay B. The operation of relay B in turn operates relay W under the control of relay WT. The circuit may be traced from ground through contact 1 of relay WS, contact 7 of relay B, contact 2 of the make-before-break contact combination of relay WT and the winding of relay W to battery. The operation of relay W by opening its contact 1 extinguishes the lamps such as lamp LAB. The operation of relay W also establishes a path from battery through winding of relay WT, contact 6 of relay W, contact 7 of relay B and contact 1 of relay WS to ground operating relay WT. The operation of relay WT causes it to lock over a path from battery through its contact 1 and the remainder of the circuit just traced to ground at contact 1 of relay WS. The operation of relay WT by opening its contact 2 releases relay W which again lights the lamps such as lamp LAB. The operation of relay B in turn operates relay AF which releases relay B as heretofore described. The release of relay B in turn releases relay WT and the cycle is repeated for each operation of relay A. The result, as mentioned in the foregoing, is that the circuit through the filament of the lamps such as lamp LAB is opened for approximately 30 milliseconds, for instance, in each second to wink the lamp.

It is important that relay SW in Fig. 2 should remain operated until relay A has released. This is insured by the establishing of a path from ground through the winding of relay SW, contact 1 of relay SW, conductor 113, which extends into Fig. 1, contact 10 of the First Key, contact 1 of the First Key, conductor 56, contact 3 of relay A, conductor 101, which extends into Fig. 3, contact of element BHM and contact 2 of relay TO to battery. Once relay SW has operated this path is available to maintain it operated until relay A is opened, opening its contact 3.

*Release of the holding bridge when the call is again picked up*

Assuming a line circuit, such as line circuit 52, is being held, as described in the foregoing, when any of the stations of the key telephone system, connected to that particular line, thereafter seizes the line, by operating the proper key in any line key circuit connected to that line, ground connected through contact 2 of a relay, such as relay SW, of the telephone circuit per Fig. 2, connected with that particular line key circuit, will be extended over a path corresponding to that heretofore traced through conductor 116, the closed contact of the operated key, a conductor, such as conductor 55, and a contact 3 of a relay corresponding to relay CTA to operate relay A in line circuit 52. The operation of relay A short-circuits the windings of the H relay causing the H relay to release. This removes the holding bridge, which was traced through contact 1 of relay H, across the tip and ring conductors 51 and 50, respectively, of the line to the private branch exchange or the central office. This restores the circuit to the talking condition.

*Release of the holding bridge from the central office or private branch exchange*

If a Hold Key in a circuit, such as Fig. 2, has been operated to hold a line and the line has not been picked up thereafter the condition will be indicated by the lamps such as lamp LAB which will continue to wink. If under these conditions the line at the distant central office is opened the path through the windings of the H relay, which are connected in series in the line from the central office for this condition, will be opened. This allows the H relay to release and the circuit to return to normal.

*Disconnection*

When any station connected to a line circuit, such as line circuit 52, disconnects on either incoming or outgoing calls, the operated key in that line circuit is restored to its normal unoperated condition. The opening of the contact corresponding to contact 8 of the restored key, such as contact 8 of the First Key, will release relay A and extinguish all of the signal lamps such as lamp LAB associated with the particular line circuit. The opening of contact 4 of relay A will release relay TO, the timing-out relay in Fig. 3, and restore the circuit to normal.

*Operation with local power failure*

The circuit may be equipped with ringers, such as ringer RB shown associated with the First Key only, for purpose of illustration, which ringers are bridged across conductors, such as conductors 53 and 54, through an individual condenser, such as condenser CRB. In the event that all local power fails, incoming calls will operate the bridged ringers, the alternating current being supplied, of course, from the distant office.

For the assumed condition of local power failure none of the relays in the local system can operate except relay R which operates on power supplied from the distant central station. However, it will be recalled that each line has a normally closed path for its tip and ring conductors through the contacts of power failure relay PF which relay will be released because of the power failure condition. This path will be extended for each line also through the normally closed contacts of relay CO, which will also remain in the released condition when power fails. The tip and ring conductors will be extended through conductors such as conductors 53 and 54 to a condenser, such as condenser CRB and a ringer, such as ringer RB, which are bridged across the tip and ring conductors of the associated line. Operation of the associated key, such as the First Key in response to the ringing, will connect the connected telephone circuit to the line.

If the local ringing supply, such as ringing supply 130, is still operative, the common audible ringer will also operate but will follow ringing on the line rather than locking in. When a call is answered or an outgoing call originated the windings of relay H will be short-circuited by the contacts of the power failure relay PF and the call may proceed.

*Automatic cutoff*

In perhaps its most important aspect, the present invention resides in the line access priority arrangement, the operation of which will now be described in detail. The circuits involved, as mentioned, comprise the automatic cut-off circuit individual to each line and the assiciated cut-through and control circuits for the automatic cut-off circuit which are individual to each line key circuit connectable to a particular line and common to the cut-off circuit individual to the line.

As mentioned in the foregoing the automatic cut-off circuit may be applied to any of the line facilities to afford four different preference arrangements. The four different gradations of priority of access to a line are established by arranging the interconnections between the cut-through and control relay, such as relay CTA and the automatic cut-off relay CO, in four different manners to be described in detail under this section.

*A station can cut off other stations and cannot be cut off*

The manner in which a station can cut off other stations and cannot be cut off is by arranging the automatic cut-off relay CO and the cut-through and control circuit relay CTA as shown in detail in Fig. 1.

When a call is answered or originated by a station having this first degree of priority, the relay, such as relay CTA, is operated over a conductor, such as conductor 55, in the manner heretofore described. The operation of relay CTA establishes a circuit from ground through contact 4 of relay CTA and the winding of relay CO to battery operating relay CO. It has been explained heretofore that the line circuit, such as line circuit 52, to which automatic cut-off relay CO is individual, has its tip and ring conductors, such as conductors 51 and 50, respectively, connected in parallel through a plurality of pairs of contacts such as contacts 1 and 2, contacts 3 and 4 and so forth. In the present instance there are six such pairs, the contacts being numbered 1 to 12, associated with relay CO. The path through each of these contacts is normally closed and each individual pair of conductors is associated with a separate relay, such as relay CTA. A pair of contacts on each of the relays, such as relay CTA, which contacts are normally open, provide, when the relay is closed, an alternative path for the tip and ring conductors, such as conductors 51 and 50, to the line and key circuit with which each such relay is associated. In the present instance, conductors 51 and 50 normally extend through closed contacts 11 and 12 of relay CO which shunt open contacts 1 and 2 of relay CTA. Now that relay CTA has been operated, and relay CO has also been operated, the normal path through contacts 11 and 12 is opened and the alternative path through contacts 1 and 2 of relay CTA is closed through to the line key circuit. The ground which operates relay CTA, as explained heretofore, also operates relay A in line circuit 52 through varistor 136 and contact 3 of relay CTA. Relay A must release and permit relay H to operate before relay CTA releases or the tip and ring conductors will be opened during the interval required for relay CO to release. The opening of relay SW disconnects ground instantly from the winding of relay A before relay CTA releases. If relay A were controlled from direct ground through a contact of relay CTA, relay A could not release until relay CT first released. This arrangement, that is the varistor connection, permits relay CTA to release, if a second station in another line key circuit picks up the call incoming to this particular line circuit 52, and the first station disconnects. The polarity of the varistor 136, associated with relay CTA, is such that it presents a high resistance to a ground supplied from the SW relay, associated with any other line key circuit, connected through another varistor, such as varistor 136, to the parallel connection to relay A. The operation of relay CO opens the normal connections for the tip and ring conductors to all stations associated with the automatic cut-off feature. The operation of relay CO by opening contact 15 also disconnects battery from the windings of other relays, such as relay CTA, associated with stations which can be cut off from line circuit 52 except during a call.

Stations which can be cut off, except during a call, instead of having their associated cut-through and control circuit relay, such as relay CTA, connected directly to battery, as shown in Fig. 1, are supplied battery through contact 15 of relay CO. As a result of this, when a station connected to the same line has a higher order of preference, that is to say, when another station is arranged to cut off other stations and cannot be cut off, and its associated relay, such as relay CTA, is operated, in turn operating the common cut-off relay CO, no other relay, such as relay CTA, can be operated to interfere with the station having the higher priority.

*A station can cut off other stations and can be cut off except during a call*

Refer now to Fig. 4 which shows the arrangement of the automatic cut-off circuit and the cut-through and control circuit, for the automatic cut-off circuit associated with a station, which can cut off other stations and can be cut off except during a call. In this figure, relays CTC and COC correspond to relays CTA and CO respectively, in Fig. 1. When ground is applied to conductor 155, which corresponds to conductor 55 in Fig. 1, the path is extended through the winding of relay CTC, contact 5 of relay CTC and contact 15 of relay COC to battery operating relay CTC. It is to be understood that this is possible only in the event that cut-off relay CO has not been operated by some other cut-through and control relay in the system. The operation of relay CTC establishes a circuit from ground through contact 3 of relay CTC and the winding of relay COC operating cut-off relay COC, which opens all of the other normally closed paths extending from the tip and ring of the individual line circuit. The operation of relay CTC establishes a holding circuit from battery through contact 6 of relay CTC to the left-hand terminal of the winding of relay CTC which replaces the battery supplied through contact 15 of relay COC. In other respects the operation per Fig. 4 is the same as described heretofore.

*A station or stations cannot cut off other stations and can be cut off except during a call*

Figure 5:
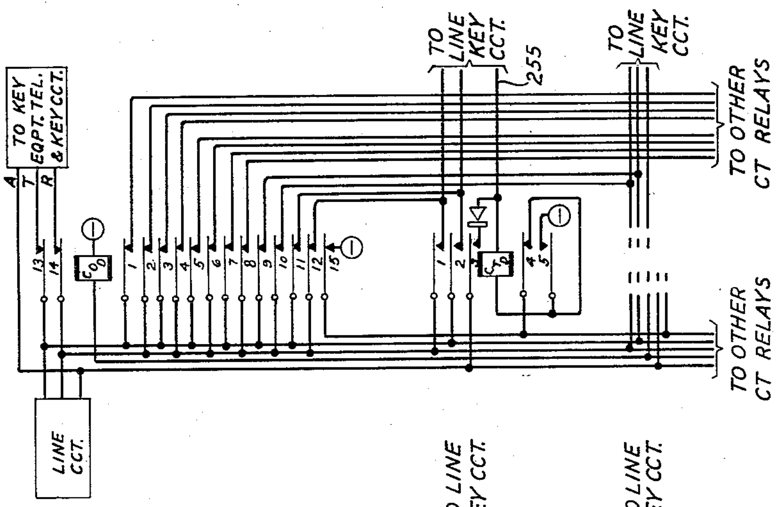
Fig. 5 shows a cut-through and control circuit for automatic cut-off and an automatic cut-off circuit arranged for yet another priority.

Fig. 5 shows the arrangement of the circuit so that a station or stations cannot cut off other stations and can be cut off except during a call. Relays CTD and COD correspond to relays CTA and CO, respectively, in Fig. 1. Reference to Fig. 5 discloses that, as in Fig. 4, battery is supplied to the left-hand terminal of relay CTD, through contact 15 of the cut-off relay COD and contact 4 of the cut-through relay CTD. Relay CTD, therefore, like relay CTC cannot be operated to get possession of the line if some other relay, such as relay CTD, in the system, associated with a station which has priority, has operated relay COD. Therefore, the station connected through relay CTD can be cut off. It will be observed further that the operation of relay CTD does not cause the operation of relay COD, as in the arrangements described heretofore, since there is no circuit connecting ground through an operated contact of relay CTD to the winding of relay COD. Therefore, the station association with relay CTD cannot cut off other stations. Once relay CTD is operated, it is held operated from battery through its contact 5 to the left-hand terminal of the winding of relay CTD. Therefore, since the operation of relay CTD closes the tip and ring conductors of the line through to the station associated with relay CTD, irrespective of the operation of relay COD, the station connected to relay CTD cannot be cut off while it is thus connected during a call. In other respects the operation of this arrangement is the same as described for the other options. All stations connectable to a particular outside line, which cannot cut off other stations and can be cut off except during a call, may be connected in parallel to one relay, such as relay CTD.

*A station or stations cannot cut off other stations and can be cut off at any time*

The operation of the system arranged for this option, also, can be explained from reference to Fig. 5, for instance, as no separate figure is considered necessary.

When a call is answered or originated by a station or stations, which cannot cut off other stations and can be cut off at any time, no changes occur in the automatic cut-off circuit. All such stations on a line may be connected in parallel directly to the CO relay. Other cut-through relays associated with stations having higher order preference would operate and control the operation of the automatic cut-off relay according to their orders of preference. If another cut-through relay in the system operated and in turn operated the associated cut-off relay, upon the operation of the cut-off relay, the path to all of the stations, having the lowest priority, would be opened.

*Flashing from local telephone set to distant office*

Flashing from the local telephone set per Fig. 2 through the line circuit 52, to the distant private branch exchange or central office, to attract the operator thereat after a connection has been established, may be effected by opening the flash and ring key in the upper portion of Fig. 2. The opening of contacts 1 and 2 of the flash and ring key opens the circuit to the remote point controlling relays thereat to cause a supervisory lamp to light. The lamp is extinguished when the flash and ring key is restored to normal. The operaion may be repeated to flash the lamp until the distant operator responds.

What is claimed is:

1. In a telephone switching system, a telephone line circuit, a plurality of telephone station circuits connectable to said line circuit, a priority circuit intermediate said station circuits and said line circuit, said priority circuit having means therein responsive to the actuation of a control individual to a first of said station circuits whereby said first station circuit cuts off other station circuits from said line, and means whereby said first station circuit is protected from being cut off at any time, means responsive to the actuation of a control individual to a second of said station circuits whereby said second station circuit cuts off other station circuits from said line and means whereby said second station circuit is cut off except while operatively connected to said line, means responsive to the actuation of a control individual to a third of said station circuits whereby other station circuits are protected from being cut off from said line by said third station circuit and means whereby said third station circuit is cut off except while operatively connected to said line, means responsive to the actuation of a control individual to a fourth of said station circuits whereby other station circuits are protected from being cut off from said line by said fourth station circuit and means whereby said fourth station circuit is cut off at any time.

2. In a telephone switching system, a line circuit, a plurality of telephone circuits connectable to said line circuit, a priority circuit interconnecting said circuits for establishing the order of access of said telephone set circuit to said line circuit, said priority circuit comprising an automatic cut-off relay circuit and a cut-through and control relay circuit for controlling said automatic cut-off relay circuit, and means in said two relay circuits for establishing four orders of priority for the interconnection of said telephone circuits to said line.

3. In a telephone switching system, a telephone line circuit, a plurality of subscriber telephone set circuits connectable to said line circuit, a priority circuit interconnecting said set circuits and said line circuits, said priority circuit having means therein responsive to control means in each of said set circuits for establishing four different orders of priority of access of said set circuits to said line circuit, said means consisting of a combined cut-through and control circuit, individual to each of said set circuits, and a cut-off circuit common to all of said cut-through and control circuits, each of said combined cut-through and control circuits having a total of one relay, each said relay responsive to said control means in its respective set circuit, said cut-off circuit responsive to each of said cut-through and control circuits, said cut-off circuit having a total of one relay.

4. In a telephone system, a telephone line circuit, a plurality of telephone set circuits, a priority circuit intermediate said line circuit and said set circuits, said priority circuit comprising an automatic cut-off circuit individual to said line circuit and a plurality of relay control circuits for said automatic cut-off circuit, each of said control circuits having a single relay, one of said control circuits individual to each of said set circuits, and means in said priority circuit responsive to a control individual to each of said set circuits for interconnecting said set circuits and said line circuit in different orders of priority.

5. In a telephone system, a priority circuit for the interconnection of a plurality of individual telephone set circuits to a single telephone line circuit, said priority circuit comprising means for selectively interconnecting said line to any of said set circuits, means for cutting off all of the others of said set circuits from said line except said selected set circuit, and preference means in said priority circuit for establishing four orders of priority of the interconnection of said set circuits to said line circuit, said preference means comprising a total of one relay individual to each of said set circuits, each said relay responsive to its respective set circuit and a total of one relay common to all of said individual relays, said common relay responsive to all of said individual relays.

6. In a telephone switching system, an individual telephone line circuit, a plurality of telephone set circuits, a priority circuit intermediate said line circuit and said set circuits for interconnecting said line circuit to said set circuits, said priority circuit comprising a cut-off relay circuit having normally closed paths extending from said line circuit to each of said set circuits in parallel, a control circuit in said priority circuit having a single relay individual to each of said set circuits, a switch individual to each of said set circuits for controlling its individual control relay, each of said individual control relays having also individual means for extending said line circuit to its associated set circuit and each said control relay having means also for selectively controlling said cut-off relay circuit according to the order of preference assigned to its associated set circuit.

7. In a telephone switching system, a priority circuit for selectively establishing connections between a plurality of telephone set circuits and a single telephone line circuit according to orders of preference assigned to said set circuits, said priority circuit comprising a first means for interconnecting said line circuit to all of said set circuits and a second means for connecting said line circuit to an individual set circuit, a control for said second means individual to said set circuits, and another control for said second means individual to said first means.

8. In a telephone switching system, a preference circuit for interconnecting a telephone line to a plurality of telephone set circuits according to an established order of preference, said preference circuit comprising a first relay individual to said telephone line and a plurality of other relays individual to each of said set circuits, means interconnecting said first relay and said plurality of second relays to afford the required preferences, said means comprising a control circuit for one of said second relays responsive solely to the actuating of a switch individual to its associated set circuit, said means comprising also another control circuit for another of said second relays, said control circuit responsive jointly to a switch associated with its individual set circuit, and another switch individual to said first relay.

9. In a telephone switching system, a local switching terminal, a telephone line circuit incoming from a distant terminal to said local terminal, a plurality of telephone station circuits each having telephone transmitting and receiving equipment therein at said local terminal, a priority circuit at said local terminal intermediate said line circuit and said station circuits, means at said local terminal for connecting each of said telephone station circuits through said priority circuit to said line circuit, a switch individual to each of said telephone station circuits for controlling said priority circuit, means in said priority circuit under control of a first of said switches whereby a station cuts off other stations from access to said line and is prevented from being cut off at any time, means in said priority circuit under control of a second of said switches whereby a station cuts off other stations from access to said line and is cut off except while operatively connected to said line during a call, means in said priority circuit under control of a third of said switches whereby a station is prevented from access to cutting off other stations from said line and is cut off except while operatively connected to said line during a call, and means in said priority circuit under control of a fourth of said switches whereby a station is prevented from cutting off other stations from said line and is cut off at any time.

References Cited in the file of this patent

UNITED STATES PATENTS

| | | |
|---|---|---|
| 2,070,642 | Beaumont | Feb. 16, 1937 |
| 2,377,562 | Lomax | June 5, 1945 |